United States Patent [19]
Mutty

[11] 3,907,153
[45] Sept. 23, 1975

[54] FUEL TANK VENTING SYSTEM
[75] Inventor: Paul R. Mutty, Lansing, Mich.
[73] Assignee: General Motors Corporation, Detroit, Mich.
[22] Filed: Feb. 19, 1974
[21] Appl. No.: 443,801

[52] U.S. Cl. ................. 220/86 R; 55/387; 137/587; 141/59
[51] Int. Cl.² .......................................... B65B 31/00
[58] Field of Search ............ 220/86 R, 85 F, 85 VS, 220/85 VR, 46 R, 44 R, 24 GT, 40 S, 85 R, 85 S; 137/587, 588, 589; 251/335 B; 141/392, 290, 59; 55/387, 316, 74

[56] References Cited
UNITED STATES PATENTS

| | | | |
|---|---|---|---|
| 2,058,118 | 10/1936 | White | 141/392 |
| 2,829,796 | 4/1958 | Dieny | 220/44 R |
| 3,380,619 | 4/1968 | Boddie | 220/86 R |
| 3,434,621 | 3/1969 | Previte | 220/44 R |
| 3,477,611 | 11/1969 | Niles | 220/86 R |
| 3,566,928 | 3/1971 | Hansel | 141/392 |
| 3,683,878 | 8/1972 | Rogers | 220/86 R |
| 3,692,051 | 9/1972 | Eyb | 137/587 |
| 3,748,829 | 7/1973 | Joyce et al. | 220/86 R |
| 3,800,978 | 4/1974 | Sigwald | 220/85 R |
| 3,804,291 | 4/1974 | Fricker | 220/86 R |

FOREIGN PATENTS OR APPLICATIONS

| | | | |
|---|---|---|---|
| 836,075 | 6/1960 | United Kingdom | 220/86 R |
| 1,925,719 | 1/1971 | Germany | 220/86 R |

*Primary Examiner*—William I. Price
*Assistant Examiner*—Allan N. Shoap
*Attorney, Agent, or Firm*—J. C. Evans

[57] ABSTRACT

A fuel tank vapor venting system includes a restricted vent pipe from the dome of a fuel tank and an unrestricted vent pipe from the open inlet of a tank filler pipe. A cap on the filler pipe has a primary seal to direct vapor forwardly of a conduit intercommunicating the restricted and unrestricted vent pipes and further has secondary seal means coacting with means on said filler pipe to prevent flow of vapors or liquid from the tank to the unrestricted vent pipe when the cap is in place whereby vapor flow from the tank is through a restricted control orifice. When the cap is removed and the filler pipe inlet is completely sealed during refueling, vapor escape from the tank is upwardly through the filler neck thence through the unrestricted vent pipe whereby closed system refueling can proceed with little or no pressure buildup in the fuel tank.

4 Claims, 4 Drawing Figures

US Patent   Sept. 23,1975   3,907,153

FUEL TANK VENTING SYSTEM

This invention relates to fuel tank venting systems and more particularly to sealed fuel tank systems having carbon canister for absorbing vapors from the system and wherein the system includes a closed refueling phase of operation where a filler pipe inlet is completely sealed during refueling so that all vapors are kept within the vehicle.

An object of the present invention is to provide an improved, easily assembled fuel tank venting system that includes means for restricting flow of vapors to a carbon canister during normal vehicle operation and means for producing unrestricted flow of vapors from the tank during a closed, refueling phase of operation to cause refueling to proceed with little or no pressure buildup in the fuel tank.

Another object of the present invention is to provide an improved fuel tank venting system including a domed fuel tank having a filler pipe with an open end and including a restricted vapor vent pipe on the tank dome and an unrestricted refueling vent pipe on the open end of the filler pipe that are intercommunicated to direct fuel vapors from the tank to a carbon canister and wherein improved cap sealing means are included at the open end of the filler pipe to provide a primary pipe seal to prevent the escape of vapor from the exteriorly located vent pipe fittings and an internal secondary cap seal means to seal against the escape of vapor through the unrestricted vent pipe during normal vehicle operation and divert vapors through a restricted vent and wherein the cap is removable from the open end of the filler pipe so that external seal means on a fuel nozzle can sealingly engage the open end of the filler pipe to completely seal the tank and pipe during a refueling phase of operation wherein vapor flow is through the unrestricted vent pipe so that refueling can proceed with little or no pressure buildup in the fuel tank.

Further objects and advantages of the present invention will be apparent from the following description, reference being had to the accompanying drawings wherein a preferred embodiment of the present invention is clearly shown.

Figures 1, 2, 3, 4:
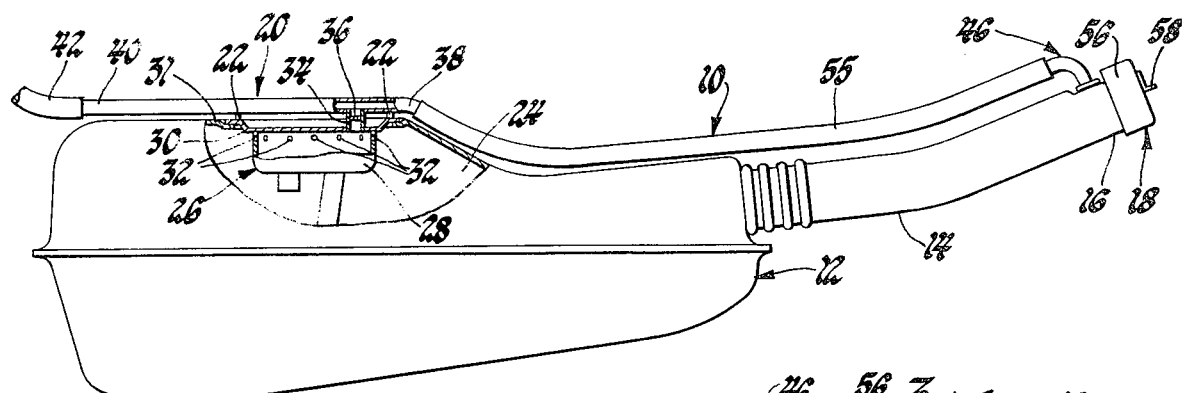
FIG. 1 is an elevational view of a fuel tank venting system including the present invention.
FIG. 2 is an enlarged fragmentary sectional view of a cap seal assembly in the fuel system of FIG. 1 shown partly in elevation and partly in section.
FIG. 3 is a fragmentary cross-section taken along the line 3—3 of FIG. 2 looking in the direction of the arrows.
FIG. 4 is view of the filler neck during a closed refueling phase of operation with the seal cap assembly removed and an external nozzle seal in place.

Referring now to the drawings in FIG. 1. a fuel tank venting system 10 is illustrated including a domed fuel tank 12 having a filler pipe 14 extending therefrom with an upper open end 16 having a multiple seal cap assembly 18 connected thereto.

A first vapor vent pipe 20 is connected to the tank 12 at the vapor dome thereon by means of a bracket 22. It is intercommunicated with the vapor space 24 of the tank 12 through a vapor liquid separator 26 including a cup-shaped receiver 28 located within the upper end of the vapor space 24 including an upper flange 30 thereon formed on the upper wall 31 of the tank. The receiver 28 includes a plurality of circumferentially spaced openings 32 therein immediately below the flange 30 to define a normal vapor path into the interior of the receiver 28. A tubular fitting 34 is connected between the fitting 20 and the wall 31 to define a vapor flow path from the interior of the receiver 28 and the interior of the pipe 20. A vapor vent orifice element 36 is fit in the tubular member 34 to define a restricted vapor flow control between the vent pipe 20 and the cup-shaped element 28. In the illustrated arrangement, the vent path from the tank to the pipe 20 is defined by an orifice diameter of .055 inch.

The first vent pipe 20 has spaced apart open ends 38, 40 thereon. The open end 40 is connected by means of a conduit 42 to the inlet of a charcoal canister (not shown). The charcoal canister details form no part of the present invention. A charcoal cannister of the type included in present emission control systems wherein the fuel vapors are directed to the canister and absorbed on the charcoal pellets therein and are periodically purged therefrom are suitable for use with the present invention.

The system 10 includes a second vent pipe 46 with one open end 48 sealingly connected by suitable means such as a brazed fillet 50 around an unrestricted opening 52 in the filler pipe 14 adjacent the open end 16 thereof. The vent pipe 46 includes a second open end 54 thereon which is intercommunicated by means of a conduit 55 to the open end 38 of the fitting 20. The conduit 55 is located closely adjacent the upper surface of the pipe 14 and extends across the upper wall of the tank 12 to connect to the pipe 20. Thus, it is easily assembled in place on the filler pipe and tank components of the system 10 and located in space provided for such components within existing vehicle body confines.

During normal vehicle operation, the cap assembly 18 is secured to the open end 16 as illustrated in FIG. 2. The cap assembly 18 includes a large diameter open ended, cup-shaped head 56 thereon with a handle 58 secured thereto for rotating the cap assembly 18 with respect to the open end of the head 16. An axial extension 60 of the cap 18 extends axially inwardly of the open end 16 of the pipe 14 and includes a bayonet connector 62 at one end thereof having spaced apart ears 64, 66 which are directed through diametrically spaced slots 68, 70 in a retainer collar 72 that is press fit on the open end 16 of pipe 14. The collar 72 includes an annular seal surface 74 thereon. An annular seal gasket 76 secured to the inner face of the cap member 56 is held in sealing engagement with the seal surface 74 when the spaced apart ears 64, 66 are directed through the slots 68, 70 in the collar 72 and rotated with respect thereto against a cam surface 78 on the axial inner end of a small diameter inwardly directed extension 80 of the collar 72.

Additionally, when the cap assembly 18 is in place, an annular O-ring 82 supported on a radially inwardly directed groove 84 at the distal end 86 of the cap extension 60 is pressed into sealed engagement with the inner surface of a small diameter tubular extension 88 formed on a secondary seal member 90 fixedly secured to the inner surface of the pipe 14 immediately downstream of the unrestricted vapor vent opening 52 thereof. The extension 88 is located concentrically of the open end 16 of the pipe 14 and coacts with the O-ring seal 82 to define a secondary cap seal between the vapor space 24 of the tank 12 and the open end 16 of the filler pipe 14.

Accordingly, when the cap assembly 18 is in place, a two-stage seal action is produced including a primary seal between the outer member 56 of the cap assembly 28 and the connector collar 72 as defined by the gasket 76. This primary cap seal will seal against vapor flow or liquid flow from the exteriorly located vent pipes 46, 20 through the upper open end 16 of the filler pipe 14. Concurrently, the O-ring seal 82 and extension 88 coact to define a secondary cap seal effect that blocks communication between the vapor space 24 of the tank 12 and the unrestricted opening 52 in the filler pipe 14. As a result, during normal vehicle operation, the vapor expansion within the tank 12 is under the control of the restricted orifice 36 into the first vent pipe 20 from whence restricted vapor flow will pass through the conduit 42 to the charcoal canister. The vent orifice will afford sufficient control to prevent an excessive passage of vapor into the charcoal canister during normal vehicle operation.

By virtue of the aforedescribed arrangement, when the cap assembly 18 is removed during a closed refueling fill phase of operation, the system is conditioned for unrestricted flow of vapor from the vapor space 24 to the charcoal canister so that refueling will be conducted under little or no pressure buildup in the fuel tank 12. More particularly, as illustrated in FIG. 4, when the cap assembly 18 is removed, the open end 16 of the cap 14 is conditioned so that the retainer collar 72 is adapted to be sealingly connected to suitable closed refueling seal means such as a bellows 92 on the nozzle 94. The illustrated sealed bellows 92 includes a first end 96 that is clamped to the nozzle 94 by means of a clamp ring 98 and includes a large diameter open end 100 thereon which fits over the collar 72 to define a sealed space 102 at the open end 16 of the pipe 14. Accordingly, during the closed refueling fill phase of operation as fuel is directed through the neck 14 into the tank 12 vapor will be free to flow from the tank vapor space 24 through the unrestricted opening 52 and the first vent pipe fitting 46. Thus, refueling can proceed with little or no pressure buildup in the fuel tank.

While the embodiments of the present invention, as herein disclosed, constitute a preferred form, it is to be understood that other forms might be adopted.

What is claimed is:

1. A fuel tank venting system comprising: a fuel tank having a vapor space and a filler pipe with an open end, cap means removably connected to the open end of said pipe, means defining a restricted vapor path from said tank, a vent pipe connected to said restricted path including a first open end adapted to be connected to a charcoal canister for absorbing fuel vapors and a second open end, means defining a refueling vent opening within said filler pipe connected to said second open end and having less restriction than said first vapor path for unrestricted flow of vapor from said tank and said filler pipe during a closed fuel fill phase of operation to reduce fill pressure build-up, and seal means operative when said cap means is in place on said filler pipe to block communication between said tank and said refueling vent opening so as to direct vapor flow from said tank through said restricted vapor path during vehicle operation.

2. A fuel tank vent system comprising: a fuel tank having a vapor space and a fuel filler pipe, means including a restricted orifice from said tank and a vent pipe adapted to be connected to a carbon canister for absorbing vapors from the tank, an unrestricted opening in said filler pipe for directing vapor from said tank during a closed fuel filling phase of operation, a fuel cap on said pipe for closing said pipe after fill, means within said filler pipe for sealing against said fuel cap thereon to effect a secondary seal between said tank and said unrestricted filler pipe vapor opening whereby vapor flow is directed only through said orifice when the cap is in place, and means for removing said secondary seal means during the closed fill phase of operation to allow vapor flow from said tank to pass through said unrestricted filler neck opening, and means for connecting said filler pipe vapor opening to said vent pipe whereby fuel vapors are directed to the charcoal canister from the tank during the closed fuel fill phase of operation without undesirable increase in tank pressure.

3. In a fuel system comprising a tank having a vapor space and a fuel filler pipe with an open end, the improvement comprising: a first vapor vent pipe connected to said tank having opposite opened ends thereon, a second vent pipe on said filler pipe adjacent the open end thereon, means defining a restricted vapor path from the vapor space of said tank into said first vent pipe, means defining an unrestricted vapor opening in said filler pipe in communication with said second vent pipe, seal means within said filler pipe located between said tank and the unrestricted opening in said filler pipe, cap means adapted to be removably secured to the open end of said filler pipe including means thereon coacting with said seal means to define a secondary cap seal between said tank and said unrestricted opening when the cap is in place whereby vapor flow is through said restricted flow path to a carbon canister for absorbing vapors from said tank during vehicle operation, means defining a primary cap seal between said cap and said filler pipe to seal the unrestricted opening during vehicle operation, said primary and secondary cap seals being removably during a closed fill phase of operation so that vapors are directed from the vapor space tank upwardly through the filler pipe to pass through said unrestricted opening thence through said second vent pipe and said first vent pipe to said carbon canister whereby refueling can proceed with little or no pressure buildup in said fuel tank.

4. A fuel tank venting system for a domed fuel tank having a closed refueling mode of operation wherein the filler inlet is completely sealed uring refueling comprising: a filler pipe to said domed fuel tank having an open end, a first vent pipe on said tank having opposite open ends thereon, means defining a restricted flow path from the dome of said tank to said first vapor vent pipe, a second vapor vent pipe on said filler pipe adjacent the open end thereof having an unrestricted opening thereto, a cap for sealing the open end of said pipe including primary cap seal means thereon engageable with said filler pipe to seal thereagainst to prevent vapor flow from said first vent pipe through the open end of said filler pipe, coacting means on said filler pipe and said cap defining a secondary cap seal to seal between the tank and said second vent pipe to cause vapor flow from said tank to be controlled through said restricted path thence through said first vent pipe for flow to a charcoal canister for absorbing vapors during vehicle operation, said cap being removable from said open end of said filler pipe to open communication between said tank and said second vent pipe and to condition said filler pipe for a closed refilling phase of operation wherein the filler inlet is completely sealed, and means for connecting said second vent pipe with one of the open ends of said first vent pipe to direct unrestricted flow of vapor from said tank to said charcoal canister during a closed fill phase of operation with little or no pressure buildup in the fuel tank.

* * * * *